Feb. 7, 1961  H. J. C. NIEUWENHOVEN  2,970,529
FOCAL PLANE SHUTTER
Filed Jan. 11, 1957  2 Sheets-Sheet 1
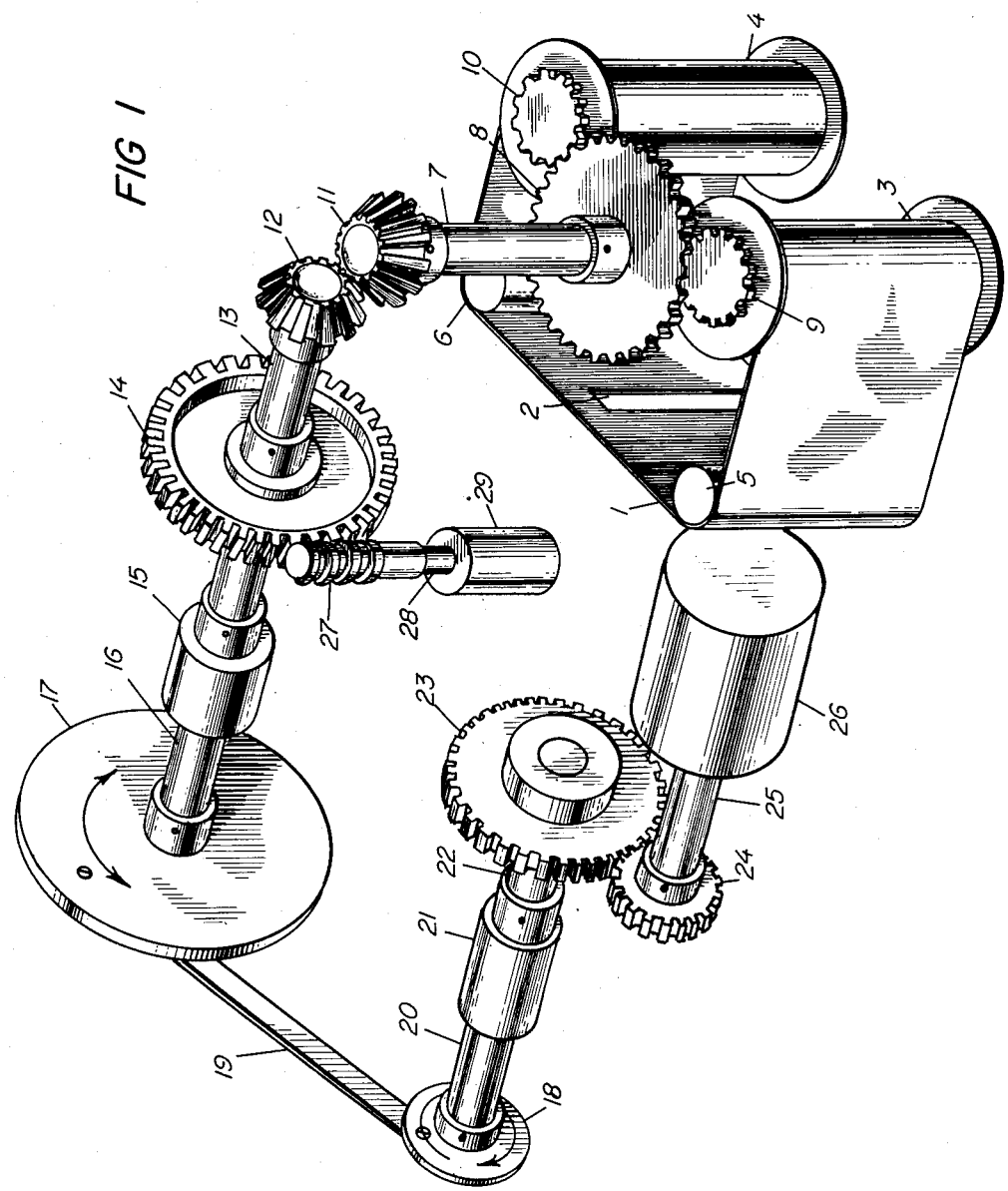
INVENTOR.
*H.J.C.Nieuwenhoven*
by *Wenderoth, Lind & Ponack*
ATTORNEYS Feb. 7, 1961  H. J. C. NIEUWENHOVEN  2,970,529
FOCAL PLANE SHUTTER
Filed Jan. 11, 1957
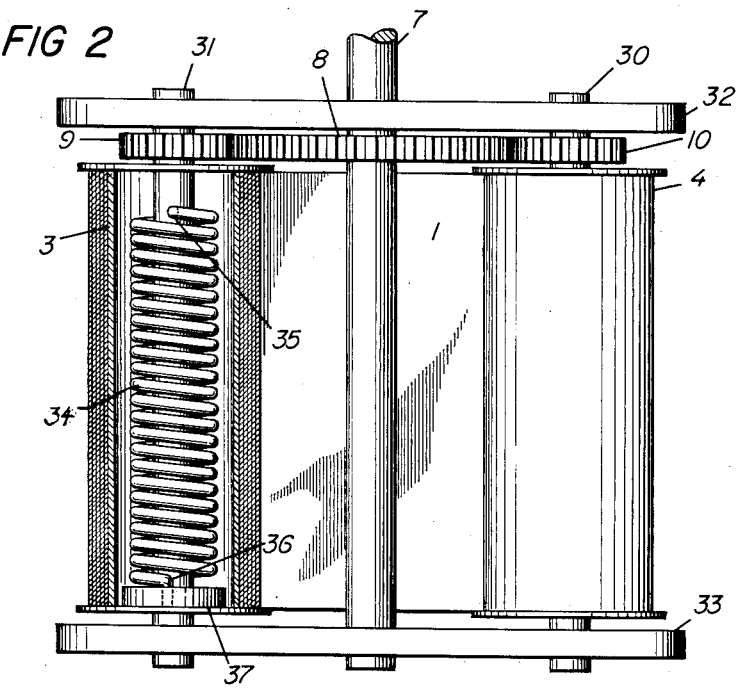
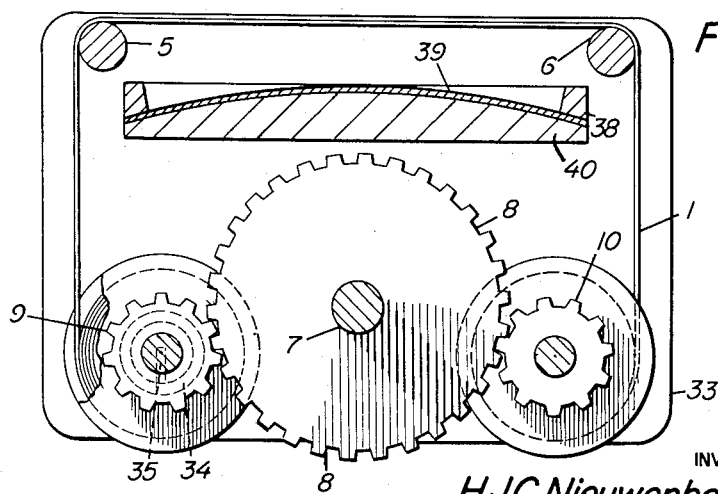
INVENTOR.
H.J.C. Nieuwenhoven
by Wenderoth, Lind & Ponack
ATTORNEYS

2,970,529

FOCAL PLANE SHUTTER

Hendricus Jacobus Cornelis Nieuwenhoven, Rijswijk, Netherlands, assignor to N.V. Optische Industrie "de Oude Delft," Delft, Netherlands Filed Jan. 11, 1957, Ser. No. 633,579

Claims priority, application Netherlands Jan. 12, 1956

4 Claims. (Cl. 95—57)

The invention relates to focal plane shutters for cameras, and more specifically to a focal plane shutter of the type in which the driving mechanism of the shutter is mechanically coupled to both of the spools for the shutter band so as to permit exposure of the film during the forward as well as during the reverse movement of the shutter band.

In the construction of certain types of modern cameras much labour is spent in raising the shutter band speed as well as the number of shots which can be taken by the camera per unit of time. In some cases a shutter may be required which is able to expose the film as much as 10 to 20 times per second. Examples of this are high aperture cameras for aerial photography adapted for making series of pictures from an aeroplane flying at high speed and at low or moderate altitudes. The pictures should nevertheless cover the complete area surveyed and therefore should overlap each other to a certain extent. A difficult problem in constructing such cameras is to brake and reaccelerate the moving parts of the shutter especially the shutter band, during the very short rest intervals between successive exposures, without inducting vibrations in the camera. Such vibrations would result in blurred images and are for that reason inadmissible.

The known constructions can in no way satisfy the severe requirements set forth above. It is the principal object of the invention to provide a focal plane shutter which is capable of working at the highest exposure repetition rates nowadays required while causing the least possible accelerating and retarding forces. It is a further object of the invention to arrange the coupling between the driving mechanism and the spools of the shutter band so as to prevent slackening of the shutter band at some points on its stroke and excessive tightening of the shutter band at other points.

To this end a focal plane shutter according to the invention is provided with a driving mechanism comprising a shaft which is driven at a speed substantially sinusoidally varying with time, said shafts being coupled to the shutter band spools so that the positive and negative maxima of the sinusoidal speed occur at a time during the course of the shutter band when the slot of the shutter band is situated substantially opposite the centre of the film surface.

In this way the reversal of the shutter band movement during the short intervals available between successive exposures may be effected with fully defined acceleration and braking forces which may be reduced to a minimum value, according to shutter specifications, whereas nevertheless the speed of the shutter band during the exposure interval may be made very high and will be constant to a satisfactory extent. The sinusoidal movement of the shutter driving shaft may be derived from a constant rotational movement for instance of a motor shaft, by means of very simple and reliable coupling elements, an example of which will be described in detail hereinafter.

In a preferred embodiment of the invention the mechanical coupling between the two spools for the shutter band and the driving shaft is provided with an elastic intermediate element in order to permit one of the spools to make a certain rotation out of its normal position with respect to the other spool. In this way the shutter band is always correctly tightened during its course without having to take up tensile forces beyond admissible values. In a known shutter of the type referred to the coupling between the spools was completely rigid and all differences between the lengths of band wound onto one spool and unwound from the other had to be compensated by means of spiral springs extending in the longitudinal direction of the band and connecting the edges of the slot. Then, however, the width of the slot is not exactly predetermined and may greatly vary which, of course, is undesirable.

In the drawing a focal plane shutter constructed in accordance with the invention has been shown schematically.

Fig. 1 is a diagrammatic perspective view of the focal plane shutter showing its driving and adjustment means;

Fig. 2 is a view, partly in vertical cross section, partly in elevation, of the arrangement of the shutter band together with its spools;

Fig. 3 is a horizontal cross sectional view of the arrangement of Fig. 2

Referring to Fig. 1, 1 is the shutter band, which is provided with a number of slots of different widths of which only one, 2, may be seen in the figure. A selected one of these slots may be used for exposing the film by turning the spools 3 and 4 and so shifting the band until its part having the selected slot appears in the effective region between the spools 3 and 4.

The band is furthermore guided by rollers 5 and 6 which can turn freely. The shutter driving mechanism comprises a shaft 7, which by means of a gearing 9, 10 is coupled to the shafts of the spools not shown in this figure. To the axis 7 a substantially sinusoidal speed rotation is imparted by means of a wheel 17, coupled to shaft 7 and a motor-driven wheel 18, which are interconnected by a driving rod 19. Wheel 17 is fixed on a shaft 16 coupled to shaft 13 which drives shaft 7 via a bevel gearing 11, 12. On shaft 13 there is arranged a worm wheel 14 which engages a worm 27 at the end of shaft 28 of a reversible electric motor 29. The latter arrangement, together with the coupling 15 between the shafts 16 and 13 which may be disengaged electromagnetically, constitute a means for adjusting the camera shutter by turning the spools 3 and 4 until the selected slot is in the effective region.

The wheel 18 is fixed on a shaft 20 connected to a shaft 22 by a coupling 21. Shaft 22 is in turn connected to the shaft 25 of an electric motor 26 by a reduction gearing 24, 23. As shown in the drawing the wheel 17 has a diameter greater than the diameter of wheel 18. This means that a uniform rotational movement imparted to wheel 18 is transformed by the driving rod 19 into a swinging movement of the wheel 17. Thus, each full revolution of the shaft 20 causes shaft 16 to turn in one direction through a fraction of one revolution and then to turn back through the same angle until the initial position is reached again. It will be easily seen that by the simple arrangement described an alternating speed may be imparted to the shaft 7 which, in good approximation, varies sinusoidally with time. Though many other possibilities for deriving such a speed variation exist and are known to those skilled in the art the particular form of driving mechanism described is preferred for its simplicity and reliability.

The arrangement of Fig. 1 operates as follows. When the camera should be made ready for exposures the electric motor 26 is started after releasing coupling 21. If necessary, coupling 15 is also disengaged in order to allow electric motor 29 to turn the selected part of the shutter band into the trajectory of exposure. Then due to a signal from the camera operator, coupling 21 is tightened in order to make a series of shots. The uniform rotational movement of the shafts 25 and 22 is transmitted by coupling 21 to shaft 20 and, by means of the wheels 18 and 17 and the driving rod 19, transformed into an oscillatory rotational movement of shaft 16. The latter movement is transmitted by coupling 15 and bevel gearing 11, 12 to the shaft 7 which, in turn drives through gearing 8, 9, 10 the spools 3 and 4. When gearwheel 8 is rotated clock-wise the shutter band is unwound from spool 4 and wound onto spool 3. This rotation is maintained during an interval of sufficient duration to allow the slot 2 of the shutter band to pass from a point situated beyond the guiding roller 6 along the film surface onto a point lying behind the guiding roller 5.

In the situation shown in Fig. 1 the slot 2 is shown at the midpoint of a single exposure and at this moment the speed attains its maximum value. The stroke of the shutter band may be selected so that the exposure period proper takes for instance one third part of a half period of the sine function, the accelerating and braking intervals before and after the exposure period taking also one third of said half period. In the middle third part of the half cycle during which the aperture is effective it covers a length of path which is half its complete stroke. The reason for this is that when the aperture speed is varying in time according to a sine function the length of path covered by the aperture is varying according to the corresponding cosine function. Under these conditions the speed of the slot during exposure only shows a variation of approximately ±5% with respect to its mean value which of course, is not only permissible but, in most cases, even desirable in view of the well known fact, that there is a certain light intensity drop towards the edges of the image which may be compensated thereby.

In Figures 2 and 3 two views are given of the shutter assembly, from which some details not shown in Figure 1 may be seen. In Fig. 3, 40 is the support for the film 39 which, during exposure, is curved in accordance with the image surface of the camera by pressing the support 40 against the image window 38. The curvature of the image surface is due to the fact that the shutter described is intended for use in a camera having as its principal optical part a concave spherical mirror which, as is well known, has a spherically curved image surface.

The shutter assembly comprises two support plates 32 and 33 bearing the driving shaft 7 and the shafts 30 and 31 of shutter band spools 4 and 3, respectively. Spool 4 is in fixed connection to shaft 30. Spool 3, however, is connected to its shaft 31 through a spiral spring 34. One end 36 of this spring is received by a hole in plate 37 fixed to the bottom flange of spool 3, whereas the other end 35 extends into a hole traversing the shaft 31. The spring allows the spool 3 to rotate to a certain extent around the shaft 31. The latter shaft as well as shaft 30 of the other spool, as described in connection to Fig. 1, is coupled to shaft 7 by means of gearwheels 9 and 10, respectively, engaging a gearwheel 8 on shaft 7.

The purpose of the spring 34 is as follows. The length of band which is wound up by or unwound from the spools 3, 4 per revolution depends on the effective diameter of the spools and, therefore, on the length of band present on each of the spools. If the spools were rigidly coupled they would turn through the same angle and so the shutter band itself would have to be provided with means for taking up the differences in length. This effect is particularly undesirable in the case of a long shutter band provided with various slots of different widths. According to the invention the spring connecting the spool shaft and the spool itself provides for an elasticity in the chain of driving elements permitting one of the spools to adapt its rate of rotation at all times so as to compensate for the differences in effective diameters of the spools.

Any desired known means, of which a plurality are available, may be used for prepositioning a selected curtain slot relative to the rotational position of the wheel 17 so that the slot will be opposite the center of the light aperture when the maximum shutter speed is reached.

I claim:

1. Motor-driven focal plane curtain-shutter comprising a flexible curtain having an exposure aperture, rollers upon which the curtain is wound, an electric motor, a driving mechanism for connecting said motor in driving relation with both of said rollers so as to cause said rollers to rotate in unison alternately in one direction and in the reverse direction for successive exposures, said driving mechanism comprising a first shaft connected to said motor for continuous unidirectional rotation by said motor, a second shaft connected with said rollers, means connecting said second shaft and said first shaft for translating the continuous unidirectional rotational speed of said first shaft into an alternating rotational speed of said second shaft substantially sinusoidally varying with time, said curtain having its maximum speed both in the forward and in the reverse direction at the time said exposure aperture is substantially halfway between said rollers.

2. Motor-driven focal plane curtain-shutter as claimed in claim 1 wherein the length of path covered by said exposure aperture during its forward and its reverse stroke is substantially twice the width of the effective area of the focal plane.

3. Motor-driven focal plane curtain-shutter as claimed in claim 1 wherein said means connecting said first and second shafts comprise a first wheel carried by said first shaft and a second wheel carried by said second shaft, said second wheel having a diameter substantially greater than said first wheel and said first and second wheels being interconnected by a driving rod.

4. Motor-driven focal plane curtain-shutter comprising a flexible curtain having a plurality of exposure apertures of different widths, rollers upon which said curtain is wound, an electric motor, a driving mechanism for connecting said motor in driving relation with both of said rollers so that said rollers rotate in unison alternately in one direction and in the reverse direction for successive exposures, said driving mechanism comprising a first shaft connected to said motor for continuous unidirectional rotation by said motor, a second shaft connected with said rollers, means connecting said second shaft and said first shaft for translating the continuous unidirectional rotational speed of said first shaft into an alternating rotational speed of said second shaft substantially sinusoidally varying with time, disengageable coupling means between said first and second shafts, and means for selectively operating said second shaft independently of said first shaft to select one of said exposure apertures and to adjust the normal at rest position of the selected one of said exposure apertures relative to the rollers.

References Cited in the file of this patent

UNITED STATES PATENTS

| | | |
|---|---|---|
| 934,581 | Thornton | Sept. 21, 1909 |
| 994,914 | Folmer | June 13, 1911 |
| 1,492,357 | Chamberlin | Apr. 29, 1924 |
| 1,764,066 | Chamberlin | June 17, 1930 |
| 2,309,300 | Briechle et al. | Jan. 26, 1943 |
| 2,407,277 | Hineline | Sept. 10, 1946 |